United States Patent
Stovall

[19]

[11] Patent Number: 6,144,724
[45] Date of Patent: Nov. 7, 2000

[54] COMMUNICATION INTERFACE TO DATA NETWORKS

[75] Inventor: Gregory Todd Stovall, Garland, Tex.

[73] Assignee: Nortel Networks Corporation, Richardson, Tex.

[21] Appl. No.: 09/080,134

[22] Filed: May 15, 1998

[51] Int. Cl.[7] .................................................. H04M 11/00
[52] U.S. Cl. .................................... 379/93.05; 379/93.06; 379/93.07
[58] Field of Search ............................. 379/93.05, 93.06, 379/93.07, 93.15, 93.14, 90.01, 93.01, 93.08, 156, 399

[56] References Cited

U.S. PATENT DOCUMENTS

| | | | |
|---|---|---|---|
| 4,741,026 | 4/1988 | Baxter et al. | 379/204 |
| 4,866,758 | 9/1989 | Heinzelmann | 379/94 |
| 5,636,218 | 6/1997 | Ishikawa et al. | 370/401 |
| 5,649,001 | 7/1997 | Thomas et al. | 379/93.07 |
| 5,649,005 | 7/1997 | Lynch et al. | 379/242 |
| 5,742,596 | 4/1998 | Baratz et al. | 370/356 |
| 5,761,294 | 6/1998 | Shaffer et al. | 379/90.01 |
| 5,875,234 | 2/1999 | Clayton et al. | 379/93.05 |
| 5,940,479 | 8/1999 | Guy et al. | 379/93.15 |

*Primary Examiner*—Stella Woo
*Attorney, Agent, or Firm*—W. Glen Johnson

[57] ABSTRACT

This invention relates to a communications method and device which will allow a telephone connected to the Public Switch Telephone Network (PSTN) through a switching device such as a Private Branch Exchange (PBX) to transfer data between the PSTN and a closed loop digital data network. A network interface microcontroller is installed in an analog or digital telephone connected to a closed loop digital data network. The microcontroller converts the digital network data into a form suitable for transmission through the PBX to the PSTN and converts data received from the PSTN through though PBX into the digital network protocol.

3 Claims, 4 Drawing Sheets

COMMUNICATION INTERFACE TO DATA NETWORKS

FIELD OF INVENTION

This invention relates to a communications method and device which will allow a telephone connected to the Public Switch Telephone Network (PSTN) through a switching device such as a Private Branch Exchange to transfer data between the PSTN and a closed loop digital data network, more specifically to introduce voice to a digital network directly through a telephone.

BACKGROUND OF THE INVENTION

Telephony equipment originally designed to service 4-kHz voice-grade channels is still a major component of many telephone systems. Customer owned switches, the most common version being the Private Branch Exchanges (PBXs), are used to service a large portion of business communication requirements using voice grade systems. In a typical PBX installation, the PBX couples a plurality of extensions to the Public Switch Telephone Network (PSTN) eliminating the need to have an outside line for each extension. The customer owned switch routes calls between the connected extensions and the PSTN and may also provide extended functions such as call greeting, directory assistance, voice mail, call parking and paging functions. The facilities in which PBX's are used include hospitals, office complexes, corporate offices, factories, warehouses, sports arenas, schools, universities and other facilities having a relatively large number of telephone extensions but not requiring dedicated connections to each extension.

With the increasing reliance on data transmission such as information sent from and to computers and fax machines, voice communications are but one portion of the total communication requirement of many users. In the past, data was placed on voice equipment but newer systems are primarily concerned with transferring data, and voice transfer is a subsidiary function. Efficient ways to place voice from the PSTN on data networks, such as Local Area Networks (LANs), are needed.

LANs provide a privately owned, high bandwidth, transmission medium within a limited geographic area. LANs are designed to carry digital data at higher speeds than is possible using traditional telephone lines. A system of multiple LANs can be combined together to form a Wide Area Network (WAN). Many of the businesses and institutions that use PBXs to connect traditional telephones to the PSTN have also installed LANs.

Digital signals used on LANs are not compatible with the voice circuits of public telephone network. Many older PBX systems cannot transfer digital signals to the PSTN and thus computers at these locations must be directly connected to the PSTN by modulators/demodulators (modems) which commonly use frequency shift keying to communicate via the public telephone system. Even in newer PBX systems, even though the base technology of the PBX allows pass through rates of 64 Kbps, the terminal equipment poses fundamental limitations that limit the accessible bandwidth to a much lower rate. Often a dedicated line from the digital device to the PSTN is used, circumventing the PBX and increasing the costs of the communications system. None of the circuits mentioned provide the ability to adapt LAN voice, or Voice over IP, to the TDM switched environment of the PBX or PSTN. There is a need for a method and device which enables digital devices, such as personal computers, that communicate on a LAN to connect to the PSTN for the purpose of interworking voice traffic through an existing PBX system.

The prior art has attempted to solve the PBX/LAN interface problem by installing a card in a computer connected to both the LAN and the PBX that will allow digital communication with the PBX. See U.S. Pat. No. 5,636,218 to Ishikawa et al. and U.S. Pat. No. 5,649,005 to Lynch et al. as typical examples. The obvious shortcoming of this solution is that it requires the use of a computer to provide the conversion of the digital information and bandwidth is limited. Computer memory must be dedicated to performing a PBX compatible conversion instead of processing data. Computers are expensive and their capacities are poorly utilized in the pedestrian role of PBX/LAN traffic intermediary. Additionally, software must be available for the particular LAN protocol and PBX architecture the user wishes to connect. The present invention overcomes the deficiency in the prior art by adding a card to an existing telephone that can be connected to the LAN and acts as a bridging mechanism between the LAN and the PTSN/PBX.

Telephones are designed specifically to act as communication devices and as such are much more efficient bridge between the LAN and the PSTN than a computer and modem combination. The present invention relates to a system and method for transmitting data from a network through a telephone to the PSTN by using the inherent capabilities of the telephone system.

SUMMARY OF THE INVENTION

It is an object of the present invention apparatus for transmitting data between a digital network having a transmission protocol and a public switched telephone network having a telephone, such as a private branch exchange, communicatively attached between said telephone and said public switch telephone network, and a network interface microcontroller communicatively connected between said digital network and said telephone for modifying the PSTN data and voice to be compatible with said digital network protocol. In one preferred embodiment the microcontroller is a single integrated circuit. The telephone may either be a digital or analog telephone. In a preferred embodiment the network interface microcontroller is a single integrated circuit.

It is another object of this invention to implement method for processing data sent between a digital network having a transmission protocol and a public switch telephone network comprising communicatively connecting a telephone to a digital network and a public switch telephone network, inserting a network interface controller between digital network and said telephone, and transforming said data in said network interface controller to be compatible with digital network transmission protocol. It is yet another object of this invention to allow the system to search for the recipient of the data at any location on the digital network and to forward the voice or data to the recipient.

BRIEF DESCRIPTION OF THE DRAWINGS

The features of the invention, as well as the invention itself may be best understood with reference to the following drawings, in which like numbers indicate like parts, to which.

DETAILED DESCRIPTION OF THE PREFERRED EMBODIMENTS

According to one embodiment of the invention, a digital telephone extension 120 is connected to a Private Branch Exchange (PBX) 180, that controls the digital phone and anchoring one end of the connection. Multiple computers 160, fax machines 150 and printers 170 are connected to a LAN 110.

Figure 1:
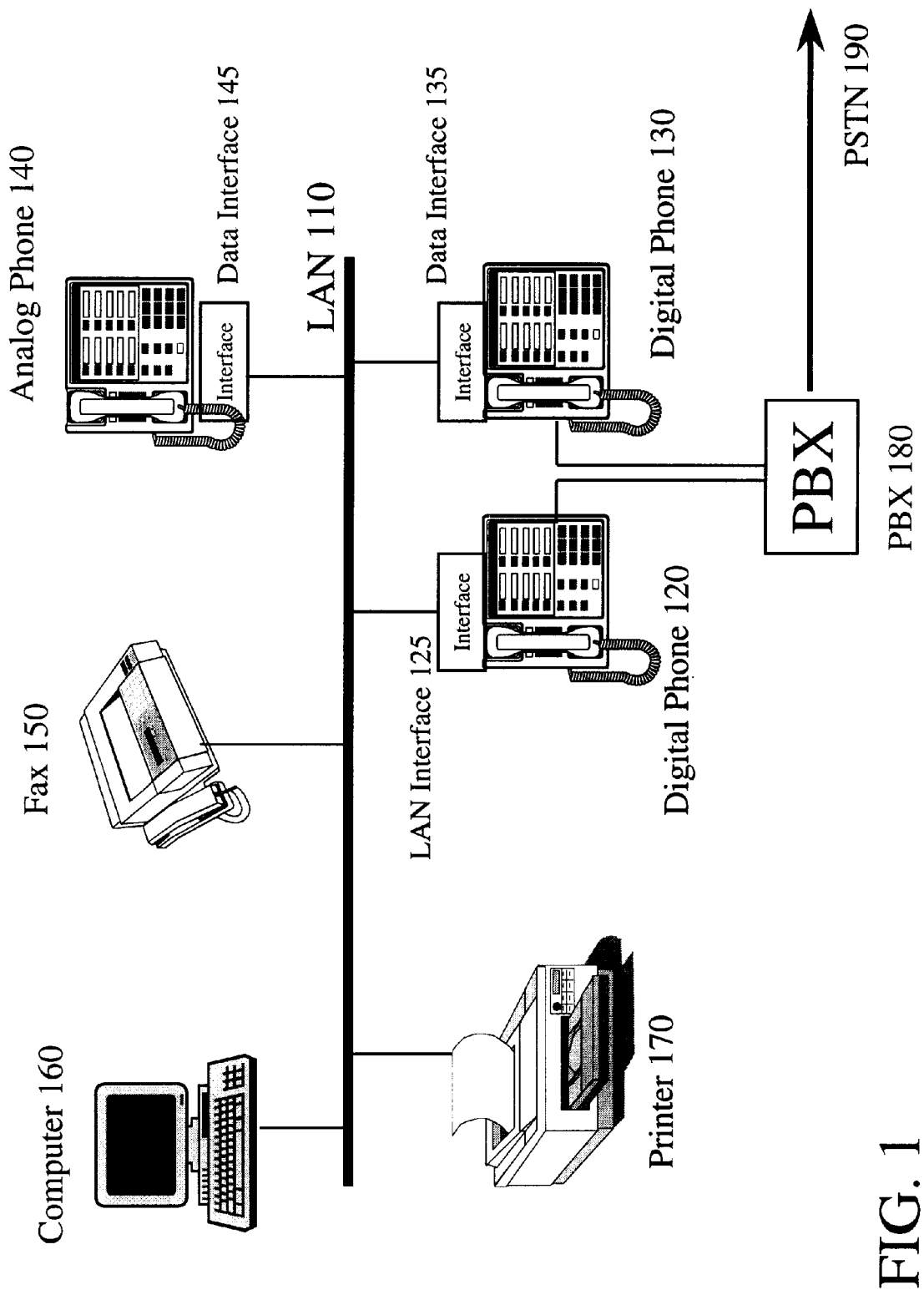
FIG. 1 is a block diagram showing a representation of a typical network embodying the present invention.
Figure 2:
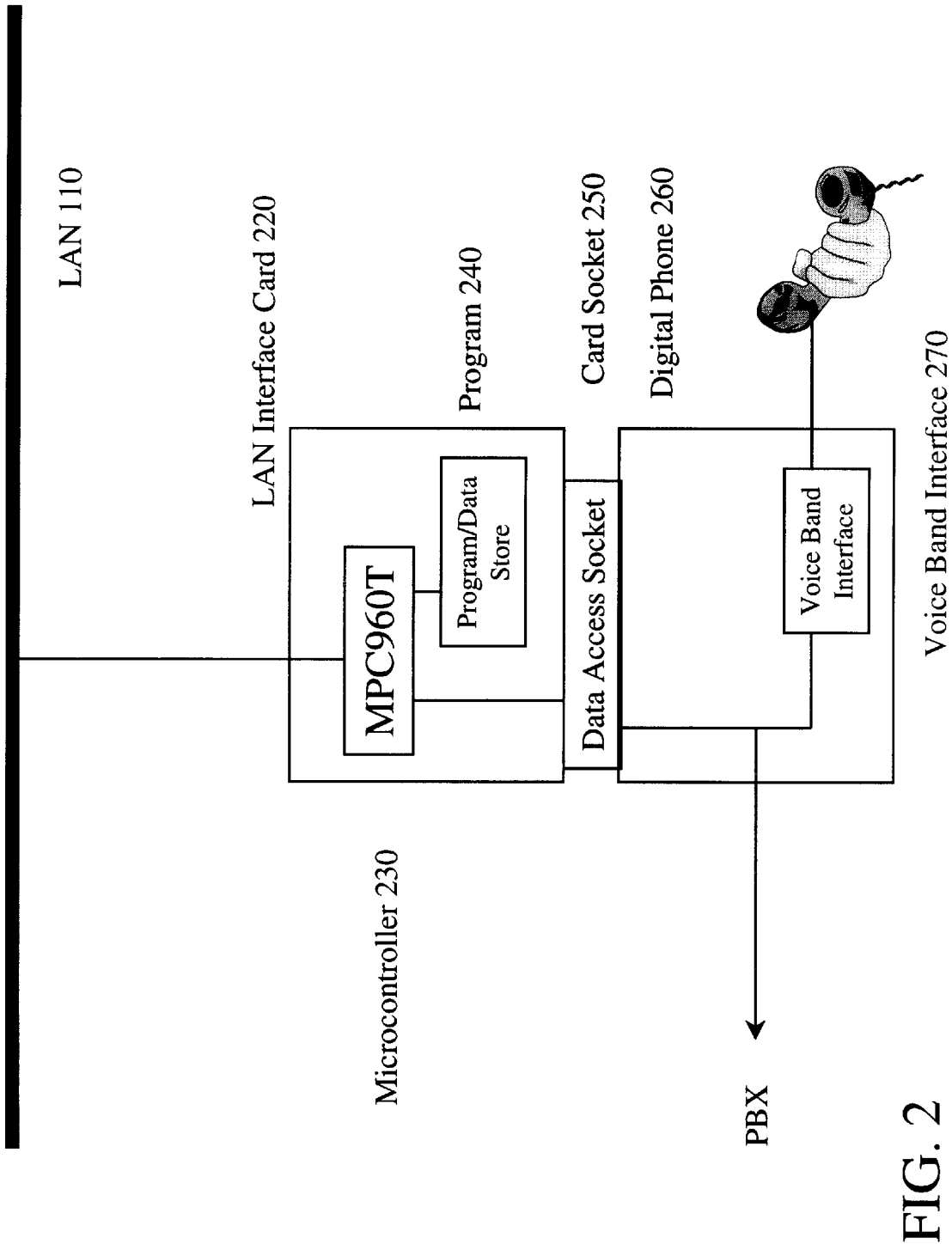
FIG. 2 is a block diagram shows a digital telephone, network interface microcontroller combination in accordance with a preferred embodiment of the present invention.

A LAN 110 interface 125, here shown as a LAN interface card 220 in FIG. 2, includes a network interface microcontroller 230 coupled to the digital telephone 120, such as the Northern Telecom M2616, through access socket 250, which provides access to digitized speech redirected from the telephone and processes the digitized speech into a LAN 110 compatible format with one or more destination devices. The Motorola MPC860T network interface microcontroller, or equivalent, is an integrated circuit which provides the necessary processing bandwidth and code decode operations to be used by the network interface microcontroller 230. The network interface microcontroller 230 can be programmed to support multiple interworking protocols, depending on the nature of the target device.

Transport media that is capable of handling such digital information over local area or wide area networks can include Ethernet or ATM. Any protocols using the IEEE 802.3, or equivalent, standard are also capable of being used. In one preferred embodiment the well-known H.323 multimedia conferencing protocol is used to transport the data over the LAN 110.

The target telephony device for exchanging speech and command control with the digital telephone could be another LAN telephone 130 or a Personal Computer (PC) 160 or other such device that is capable of handling the selected interworking protocol. The PC 160 would require multimedia hardware, such as a sound card and headset, to provide telephony functionality. Thus, the telephone connected to the PBX 180 can communicate directly with any of the other telephony devices present on the LAN 110.

Figure 3:
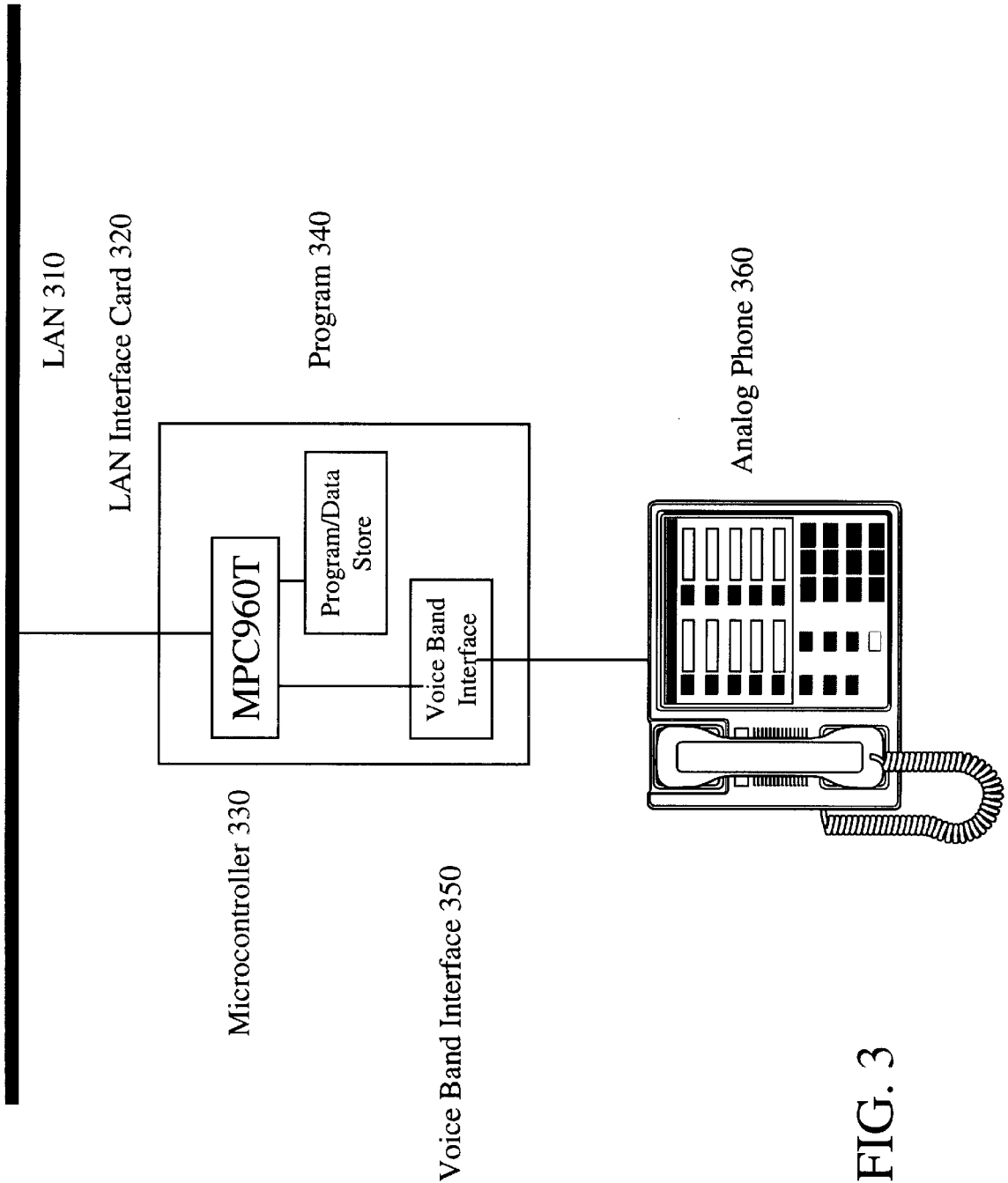
FIG. 3 is a block diagram shows an analog telephone, network interface microcontroller combination in accordance with a preferred embodiment of the present invention.

Another source or destination of the LAN telephony device is an analog telephone 360 (FIG. 3), in which a LAN interface card 320 serves as a transceiver for digitized speech sent over LAN 110. In a digital telephone system, a Pulse Code Modulation (PCM) modulator/demodulator samples voice band signals and codes them into PCM signals and multiplexes them together in various formats to form the first level digital multiplexing hierarchy. This modulator/demodulator also performs the reverse transformations when the device is receiving. Included on the LAN interface card 320 is a Voice Band Interface 350 that converts digitized speech into analog audio, and vice versa, suitable for driving analog telephone 360. The analog telephone 360 requires sufficient interface resources to display context specific soft keys and to mimic the look and feel of the digital phone; one example of this is the Northern Telecom M5316 Business Set. In this configuration, the network interface microcontroller on LAN interface card 320 provides the necessary logic to drive the interface on the analog telephone 360 in order to provide an intelligent interface to LAN 110.

Figure 4:
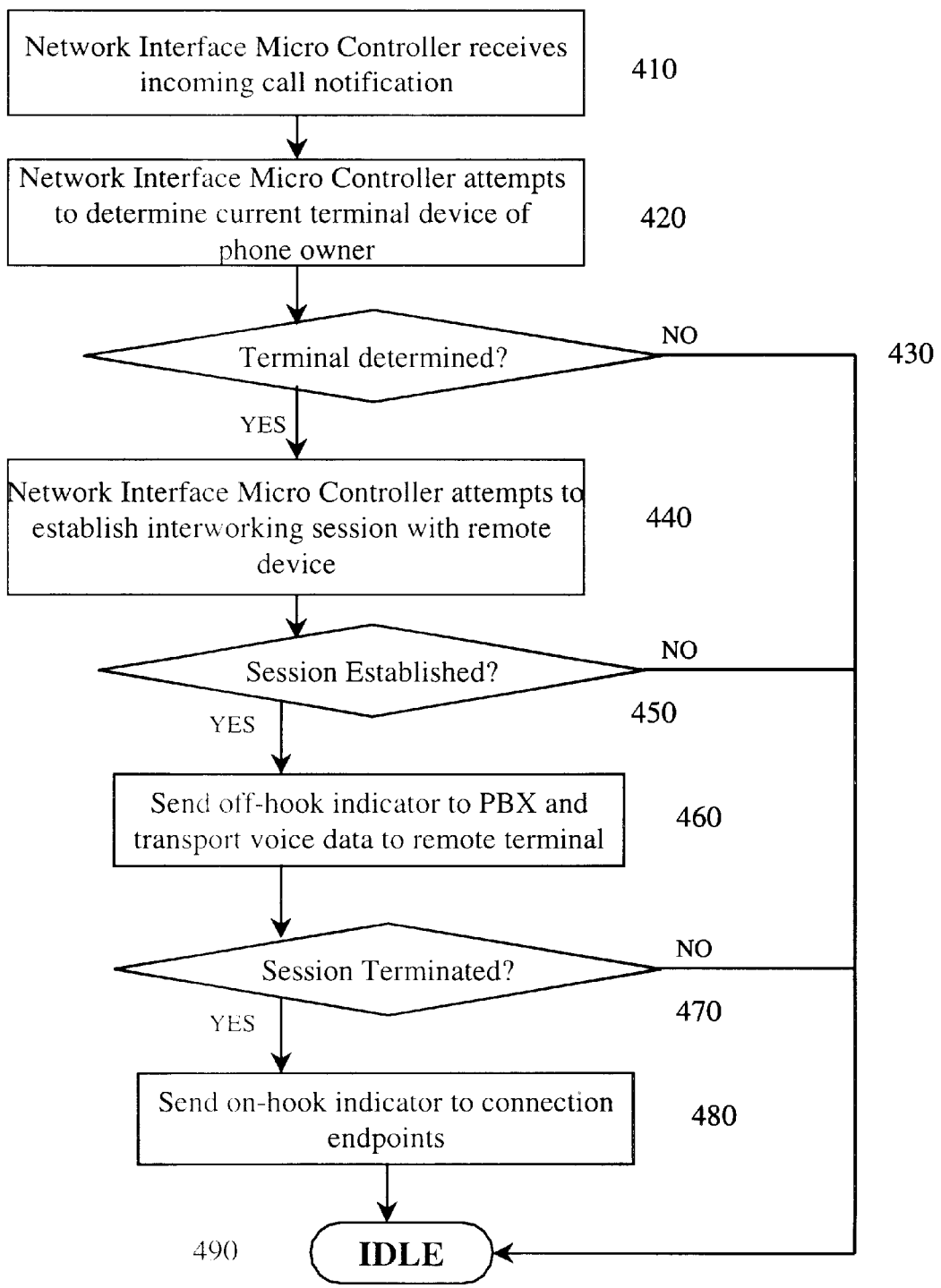
FIG. 4. Is a flow chart depicting the process of the present invention.

Referring to FIG. 4, at step 410 the network interface microcontroller 230, 330 receives notification of an incoming call from the telephone 120, 130. The notification signal can take the form of a signal line changing state, a status indicator message passed over a digital telephone interface, or a LAN message if the incoming call is off the LAN 110. In step 420, the network interface microcontroller 230, 330 checks to see if an instruction to forward calls has been placed in memory.

In the preferred embodiment the microcontroller can determine if the intended recipient of the telephone call has forwarded call to another station on the LAN or another telephone. If the forwarding address is on the LAN the voice information can be sent to new receiving device, and assuming it is equipped to receive voice, the call can be taken at the new location. As an example, an employee may have a portable computer with voice telephony capability. The employee will be away from her desk in a meeting but is taking her computer with her. If the employee connects the computer to the LAN at the new location the employee will be able to receive calls via the computer.

This location information can be supplied to the microcontroller directly from the owner by a message generated on the LAN 110 or through a telephone keypad key sequence. If the data is not available within the controller's memory, it can consult a pre-defined directory service, if one is available, to determine if the owner left any routing instructions with the directory service. In step 430, the network interface microcontroller 230, 330 must decide if it has enough information in order to route the call. If it does not, it will ignore the call, allowing it to continue to "ring" or optionally roll over to voice mail. In the instance of a call arriving from the LAN, the controller can send a reject message, telling the originator that the call cannot be completed to that terminal.

In step 440, the network interface microcontroller 230, 330 attempts to initiate a message session with the selected remote endpoint. This session can be over a variety of protocols, but the one for the preferred embodiment is H.323, which is a well-known protocol. If the network interface microcontroller 230, 330 can not successfully establish the session, due to unavailability of the remote device or resource mismatch, then the call cannot be completed and the microcontroller will ignore the call and allow it to ring to "roll over" to voice mail at the PBX 180 as in step 430. If the controller is receiving a call over the LAN 110, the controller must cause the "phone" to ring as part of the session establishment. Once Controller 230, 330 receives indication that an individual at the remote device has answered, the controller must send an off-hook indication 460 to the device or system that is originating the call. If the call arrived over the LAN 110, the off-hook message must be sent back over the LAN 110. To avoid having the called party talking to "dead air", the speech paths must be activated upon ringing the destination terminal, before the individual answers.

In step 470 the network interface microcontroller 230, 330 waits for the session to be terminated, either by one of the parties hanging up, or by some data connectivity problem in the network. When this occurs the network interface microcontroller 230, 330 sends an on-hook message to other party if the data session is still active, and activates the on-hook signal to the local device if that connection is still active. The network interface microcontroller 230, 330 then returns to the IDLE state 490, waiting for incoming call notification. From this state, the controller will progress to state 410 when a new incoming call notification is received.

While the invention is described above in terms of specific preferred embodiments and associated drawings, those of ordinary skill in the art will recognize that the invention can be practiced in other embodiments as well. It is felt therefore that the invention should not be limited to the disclosed embodiments, but rather should be limited only by the spirit and scope of the appended claims.

What is claimed is:

1. Apparatus for transmitting data and voice signals between a digital network and a public switched telephone network (PSTN) comprising:

a telephone connected to the PSTN by a PBX; and a network interface microcontroller in the telephone for connecting the telephone to the digital network, for converting signals from the digital network into a form suitable for transmission through the PBX to the PSTN, and for converting signals received from the PSTN through the PBX into a form suitable for transmission to the digital network.

2. Apparatus as in claim 1, wherein:

the telephone is a digital telephone.

3. Apparatus as in claim 1, wherein:

the telephone is an analog telephone.

* * * * *